(12) United States Patent
Hata

(10) Patent No.: US 10,332,496 B2
(45) Date of Patent: Jun. 25, 2019

(54) REFERENCE DISPLAY DEVICE, REFERENCE DISPLAY METHOD, AND PROGRAM

(71) Applicant: Yamaha Corporation, Hamamatsu-shi, Shizuoka-ken (JP)

(72) Inventor: Toshiyuki Hata, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 132 days.

(21) Appl. No.: 15/500,011

(22) PCT Filed: Jul. 28, 2015

(86) PCT No.: PCT/JP2015/071342
§ 371 (c)(1),
(2) Date: Jul. 7, 2017

(87) PCT Pub. No.: WO2016/017622
PCT Pub. Date: Feb. 4, 2016

(65) Prior Publication Data
US 2017/0352340 A1    Dec. 7, 2017

(30) Foreign Application Priority Data

Jul. 28, 2014   (JP) .................. 2014-152479

(51) Int. Cl.
*G10H 7/00*    (2006.01)
*G10H 1/36*    (2006.01)
(Continued)

(52) U.S. Cl.
CPC ............. *G10H 1/368* (2013.01); *G09B 15/00* (2013.01); *G10G 1/00* (2013.01);
(Continued)

(58) Field of Classification Search
CPC ............ G10H 2210/066; G10H 1/368; G10H 2220/015; G10H 2210/031; G10H 2220/086; G10H 1/40; G09B 15/00
See application file for complete search history.

(56) References Cited

U.S. PATENT DOCUMENTS 6,546,229 B1 *  4/2003  Love ...................... G09B 15/00
                                                    434/308
2008/0070203 A1 *  3/2008  Franzblau ................ G09B 5/02
                                                    434/157
(Continued)

FOREIGN PATENT DOCUMENTS

JP    08-190391 A     7/1996
JP    2001-318683 A   11/2001
(Continued)

OTHER PUBLICATIONS

International Search Report dated Oct. 6, 2015, for PCT Application No. PCT/JP2015/071342, with English translation, five pages.

*Primary Examiner* — Marlon T Fletcher
(74) *Attorney, Agent, or Firm* — Morrison & Foerster LLP

(57) ABSTRACT

Provided are a display device and a program which allow a user to intuitively recognize a connection and a breathing timing between respective notes. A CPU (11) generates a guide image, based on information about a sound-producing timing and a sound length of each note, which are included in a guide melody track. The CPU (11) smoothly connects respective notes. Thereafter, the CPU (11) disconnects the notes at the breathing timing indicated in a breath position track.

17 Claims, 8 Drawing Sheets

(51) Int. Cl.
*G10G 1/00* (2006.01)
*G09B 15/00* (2006.01)

(52) U.S. Cl.
CPC . *G10H 2210/005* (2013.01); *G10H 2210/091* (2013.01); *G10H 2220/011* (2013.01); *G10H 2220/015* (2013.01)

(56) References Cited

U.S. PATENT DOCUMENTS

2010/0233661 A1* 9/2010 Franzblau ................ G09B 5/02
  434/178
2017/0352340 A1* 12/2017 Hata ........................ G10G 1/00

FOREIGN PATENT DOCUMENTS

| | | |
|---|---|---|
| JP | 2004-205817 A | 7/2004 |
| JP | 2004-212547 A | 7/2004 |
| JP | 2007-264060 A | 10/2007 |
| JP | 2007-322933 A | 12/2007 |

* cited by examiner

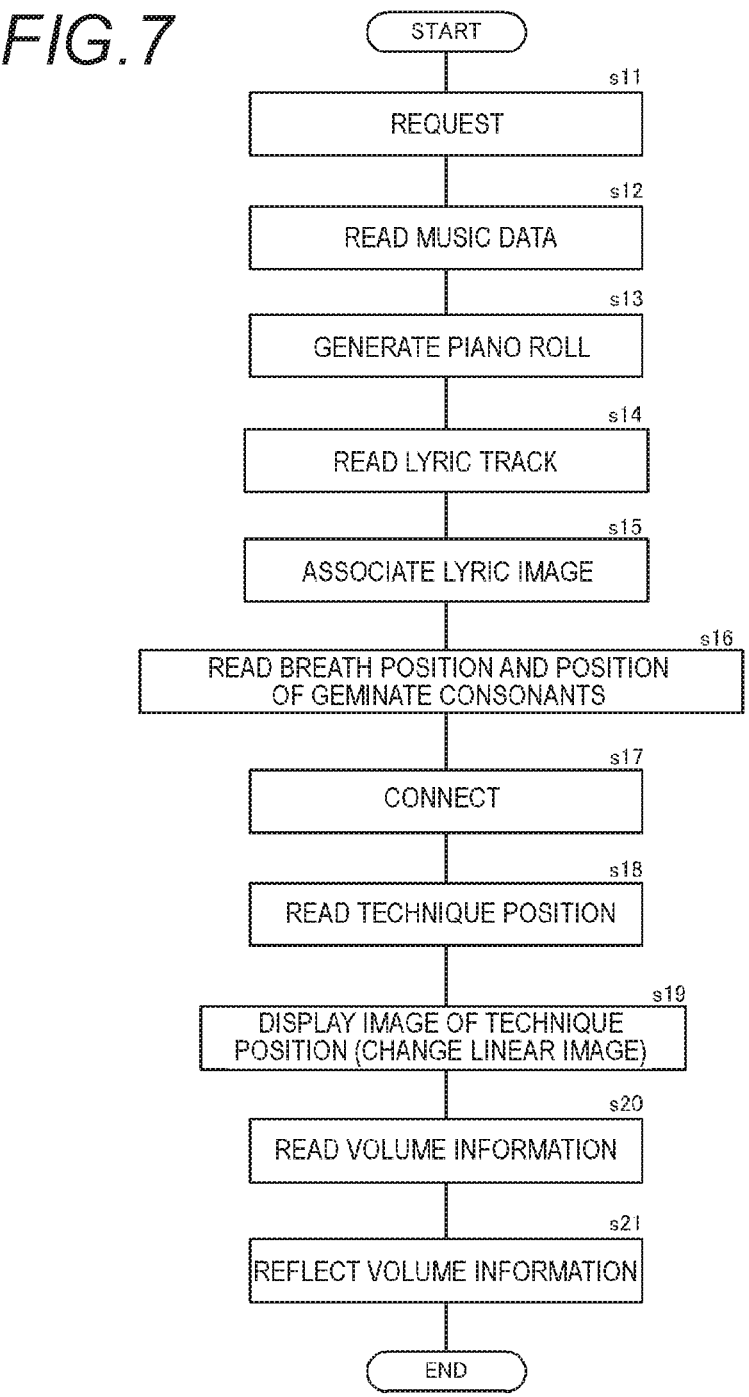

REFERENCE DISPLAY DEVICE, REFERENCE DISPLAY METHOD, AND PROGRAM

CROSS-REFERENCE TO RELATED APPLICATIONS

This application is a National Phase application under 35 U.S.C. § 371 of International Application No. PCT/JP2015/071342, filed Jul. 28, 2015, which claims priority benefit of Japanese Patent Application No. 2014-152479, filed Jul. 28, 2014.

TECHNICAL FIELD

The present invention relates to a display device, in particular, to a device of displaying a model (reference).

BACKGROUND ART

In the related art, a Karaoke device displays lyrics and model pitch on a display (for example, see Patent Literature 1). The pitch is represented as a so-called piano roll. In the piano roll, linear images depending on a sound start timing and a sound length of each note are displayed, on a screen in which a vertical axis corresponds to a scale (in a state where the keys of the piano are arranged vertically) and a horizontal axis corresponds to a time. This allows a singer to visually recognize the timing to sing and the pitch.

CITATION LIST

Patent Literature

Patent Literature 1: JP-A-2004-205817

SUMMARY OF INVENTION

Technical Problem

In singing, conversation, performance of wind instrument, or the like, instead of making respective sounds separately, the respective sounds are smoothly connected or a breath is taken between the respective sounds. Even though it is possible to recognize a start timing to make a sound and a pause timing in the piano roll in the related art, it is difficult to intuitively recognize a connection and a breathing timing between respective sounds.

Thus, an object of the present invention, without being limited thereto, is to provide a reference display device, a reference display method, and a program, which allow a user to intuitively recognize connection of respective notes and a breathing timing therebetween.

Solution to Problem

A reference display device according to an aspect of the present invention includes a display, and an image generator, configured to generate a guide image representing a sound timing, pitch, and a sound length based on reference data, and display the guide image on the display.

The image generator displays a guide image in which respective notes in the reference data are connected.

This allows users (singers, speakers, performers, or the like) to visually recognize a connection of respective notes.

The reference data also contains information indicating a breathing timing, and the image generator displays a guide image in which the previous note and the subsequent note to the breathing timing are disconnected, based on information indicating the breathing timing.

Even though it is possible to recognize a start timing to make a sound and a pause timing in the piano roll in the related art, it is difficult to intuitively recognize a connection and a breathing timing between respective notes. It becomes possible to intuitively recognize a connection and a breathing timing between respective notes, by interrupting the guide image at the breathing timing. Further, since the reference data contains information indicating a breathing timing, the reference display device of the present invention is capable of displaying a simple mute section and a breathing section with clearly distinguished, thereby allowing the user to recognize the correct position of the breathing.

In addition, the image generator is also able to display a guide image in which a phoneme relating to a geminate consonant and a phoneme subsequent to the phoneme relating to the geminate consonant are disconnected.

The geminate consonants are represented by "TSU" in Japanese kana notation and followed by mute sound. Thus, since the phoneme relating to a geminate consonant and the subsequent phoneme are disconnected, the user is able to intuitively recognize whether to sound the notes with connected, or to once pause at a note and sound the note.

In addition, it is desirable that the image generator displays a guide image of a phoneme relating to the geminate consonant and an image indicating the existence of the phoneme relating to the geminate consonant. In this case, the user is able to recognize more easily whether to sound the notes with connected, or to once pause at a note and sound the note.

Further, it is desirable that the image generator displays an image to prompt breathing in addition to the guide image, based on the information indicating the breathing timing. This allows the user to easily recognize whether to sound the notes with connected, or to take a breath.

It is preferable that the image generator superimposes an image indicating a sound timing of each note on the guide image to display. For example, in a case of sounding different lyrics continuously at the same pitch, if the guide images are connected, the user is unlikely to recognize a timing at which the user sounds the subsequent lyric. However, for example, if a circle image is superimposed and displayed on the guide image at the sound timing of each note, the user easily recognizes that the user is to sound at the timing of the circle image.

Further, it is preferable that the reference data contains information indicating a timing of a singing technique, and the image generator displays an image to prompt a singing technique, based on information indicating the timing of the singing technique. This allows the user to easily recognize the timing to perform the singing technique.

Further, by displaying a vibrato period with the guide image changed into a different image (for example, a wavy line), it is possible to more intuitively recognize the vibrato period.

Further, it is preferable that the reference data contains information indicating a volume of each note, and the image generator changes the guide image into an image depending on the volume based on the information indicating the volume of each note to display. For example, a section having a large volume is changed into a thick line, and a section having a small volume is changed into a thin line. Alternatively, a section having a large volume is changed into a line of dark color, and a section having a small volume is changed into a line of light color.

In addition, the image generator may be configured to display an image corresponding to the user (photograph of the user, a character image, or the like) at the position corresponding to the current sound timing, and scroll the guide image such that the image corresponding to the user moves along the guide image. In this case, the user can feel that the user's sound makes the character move, and enjoy singing, language learning, performance, or the like.

Further, the character image may be an objective viewpoint (a two-dimensional display) or a subjective viewpoint (a three-dimensional display). Further, in a case of display in a subjective viewpoint, for example, in a case of duet singing, a character corresponding to the user and a character corresponding to another singer can be displayed in parallel, and the user can easily feel the mood in which the user performs singing together with another singer.

Advantageous Effects of Invention

According to a reference display device or a reference display method of the present invention, it is possible to intuitively recognize a connection and a breathing timing between respective notes.

BRIEF DESCRIPTION OF DRAWINGS

FIG. 7 is a flowchart illustrating an operation of the Karaoke device.

DESCRIPTION OF EMBODIMENTS

Figure 1:
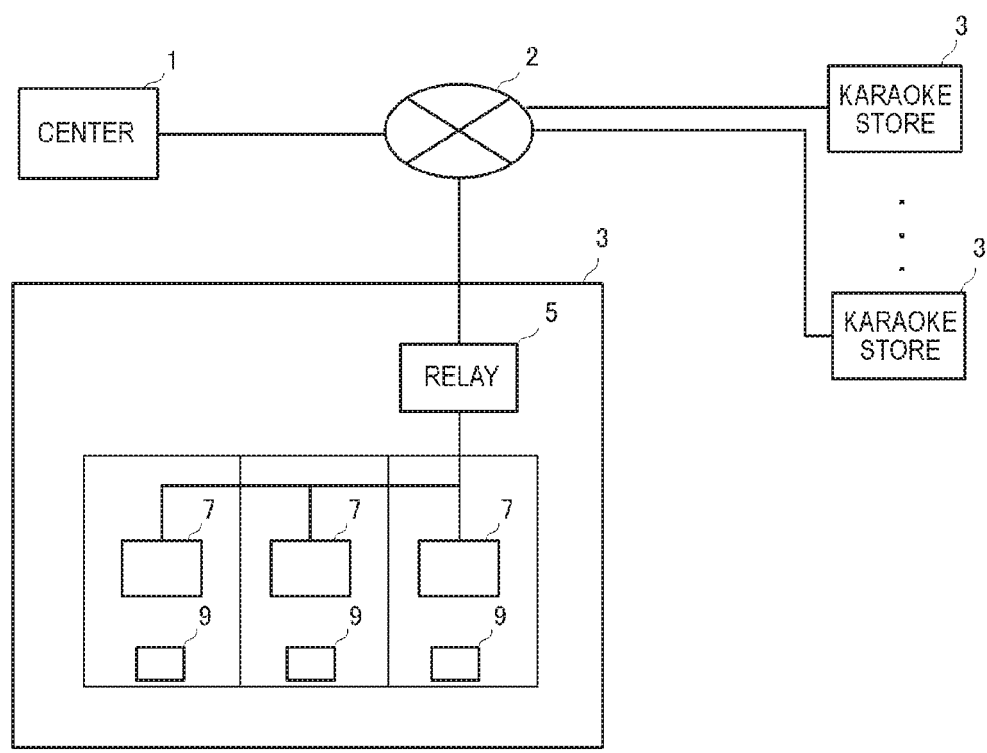
FIG. 1 is a block diagram illustrating a configuration of a Karaoke system.

FIG. 1 is a diagram illustrating a configuration of a Karaoke system including a reference display device of the present invention. The Karaoke system includes a center (server) 1 and a plurality of Karaoke stores 3 which are connected through a network 2 such as the Internet.

A relay 5 such as a router connected to the network 2 and a plurality of Karaoke devices 7 connected to the network 2 through the relay 5 are provided in each Karaoke store 3. The relay 5 is provided in a control room or the like of the Karaoke store. Each of the plurality of Karaoke devices 7 is provided in each room (Karaoke box). Further, each remote controller 9 is installed in each Karaoke device 7.

A Karaoke device 7 is communicable with other Karaoke devices 7 through the relay 5 and the network 2. In the Karaoke system, communication between the Karaoke devices 7 which are provided in different places allows a plurality of singers to sing a duet.

Figure 2:
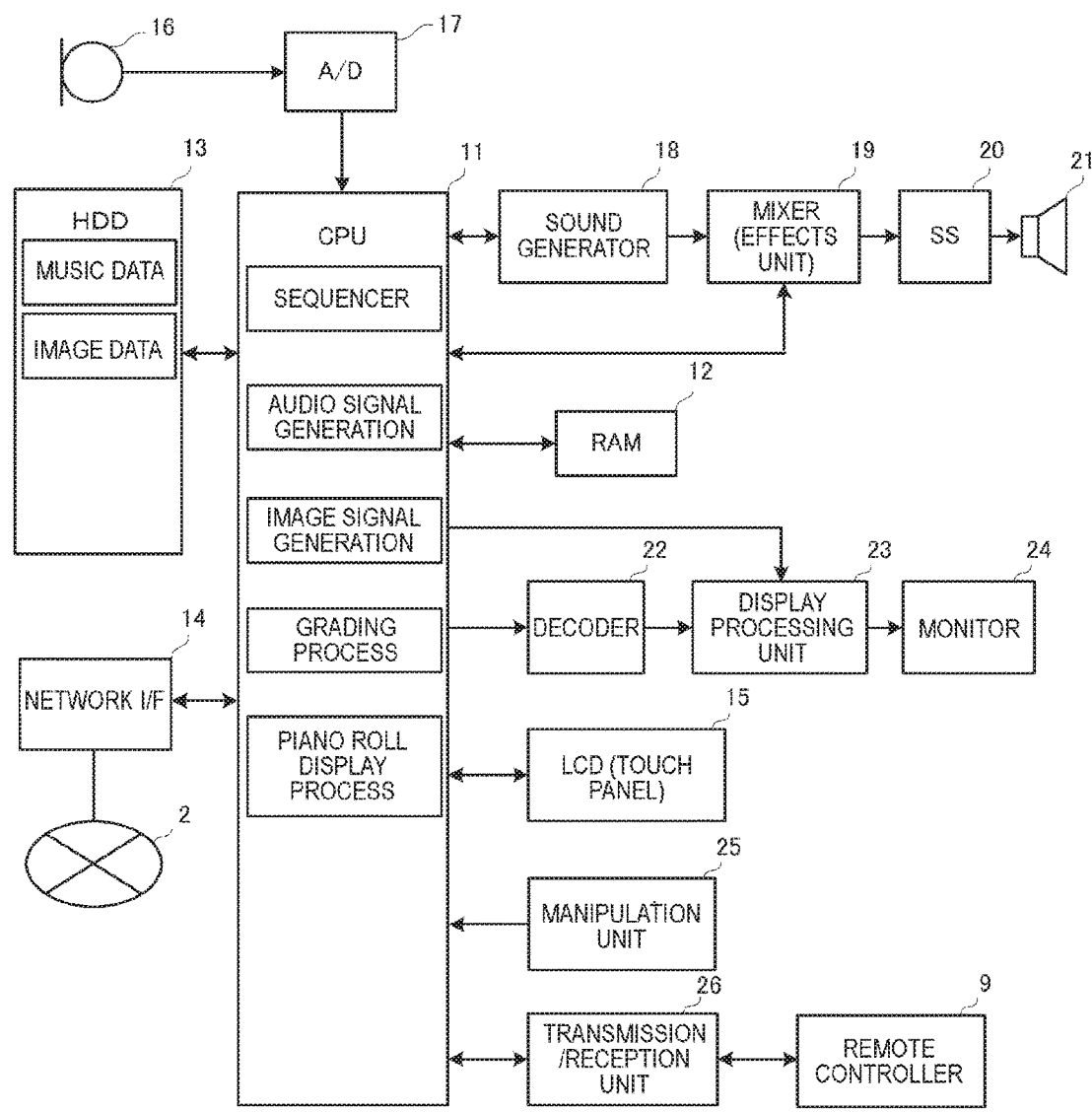
FIG. 2 is a block diagram illustrating a configuration of a Karaoke device.

FIG. 2 is a block diagram illustrating a configuration of a Karaoke device. The Karaoke device 7 corresponds to the reference display device of the present invention. The Karaoke device 7 includes a CPU 11, a RAM 12, a HDD 13, a network interface (I/F) 14, an LCD (touch panel) 15, a microphone 16, an A/D converter 17, a sound generator 18, a mixer (effects unit) 19, a sound system (SS) 20, a speaker 21, a decoder 22 for MPEG, etc., a display processing unit 23, a monitor 24, a manipulation unit 25, and a transmission/reception unit 26.

The CPU 11 that controls the operation of the entire device is connected to the RAM 12, the HDD 13, the network interface (I/F) 14, the LCD (touch panel) 15, the A/D converter 17, the sound generator 18, the mixer (effects unit) 19, the decoder 22 for MPEG, etc., the display processing unit 23, the manipulation unit 25, and the transmission/reception unit 26.

The HDD 13 stores an operation program for the CPU 11. An area from which the operation program of the CPU 11 is read so as to be performed, an area from which music data is read for playing Karaoke music, an area from which reference data such as a guide melody is read, an area in which data such as reservation lists and a result of grading is temporarily stored, or the like are configured in the RAM 12 which is a working memory.

In addition, the HUD 13 stores music data for playing Karaoke music. In addition, the HDD 13 stores image data for displaying background images on the monitor 24. The image data includes both moving image and still image. The music data and the image data is delivered from the center 1 and updated on a regular basis.

The CPU 11 is a control unit that integrally controls the Karaoke device, functionally incorporates a sequencer, and plays Karaoke music. In addition, the CPU 11 executes an audio signal generation process, an image signal generation process, a grading process, and a piano roll display process. This allows the CPU 11 to perform an image generator of the present invention.

The touch panel 15 and the manipulation unit 25 are provided in the front of the Karaoke device. The CPU 11 displays an image corresponding to the operation information on the touch panel 15, based on the operation information which is input from the touch panel 15, and thus enables GUI. Further, the remote controller 9 also realizes the same GUI. The CPU 11 executes various operations, based on the operation information which is input from the the touch panel 15, the manipulation unit 25, or the transmission/reception unit 26 through the remote controller 9.

Next, a configuration for playing Karaoke will be described. As described above, the CPU 11 functionally incorporates the sequencer. The CPU 11 reads music data corresponding to the song number of the reserved music which is registered in the reservation list of the RAM 12, from the HDD 13, and plays Karaoke by the sequencer.

Figure 3:
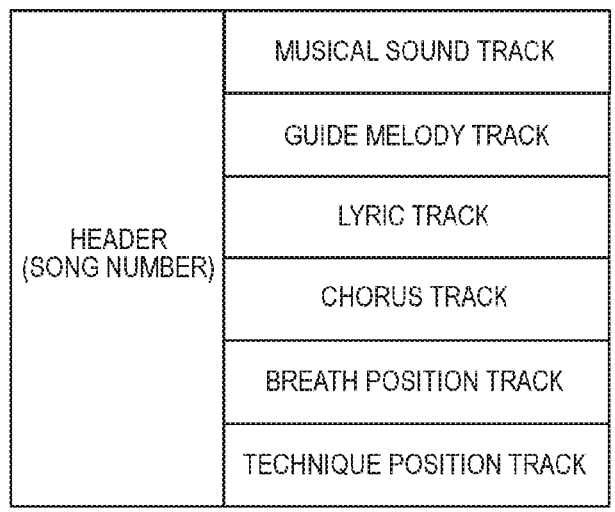
FIG. 3 is a diagram illustrating a structure of various types of data including reference data.

The music data includes, for example, as illustrated in FIG. 3, a header having a song number or the like written therein, a musical sound track having MIDI data for performance written therein, a guide melody track having guide melody for MIDI data written therein, a lyric track having MIDI data for lyrics written therein, a chorus track having a background chorus play timing and audio data to be played written therein, a breath position track indicating a breathing timing, a technique position track indicating a timing of a singing technique, or the like. The guide melody track, the breath position track, and the technique position track correspond to the reference data of the present invention. The reference data is model data that a singer refers to for singing, and contains information indicating a sound timing to make each sound, pitch, and a sound length. Note that, the format of music data is not limited to this example. Further, the format of the reference data is not limited to MIDI format as described above. For example, reference data indicating a breath position may be text data or the like indicating a timing of the breath position (the time elapsed from a music start). In a case where the reference data is audio data (for example, recorded singing sound), it is possible to extract pitch by extracting pitch, and also extract a sound timing and a sound length from a timing at which the pitch is extracted and the length of the pitch. Further, it is also possible to detect a mute section by detecting the volume (power), and in a case where the mute section is present between respective notes, extract a timing at which the mute section is extracted as a timing of a breath position. Further, in a case where the pitch is changing regularly within a predetermined period of time, it is also possible to determine that the "vibrato" is performed in the period, which enables the extraction of a timing (technique position) at which singing is performed.

Information indicating a type of instrument making musical sounds, a timing, pitch (key), strength, length, orientation (Pan), sound effects (effect), or the like are recorded on the musical sound track. Information about the sound start timing of each note corresponding to sample singing, the length of sound and the like is recorded on the guide melody track.

The sequencer controls the sound generator 18 based on the data about the musical sound track, and makes musical sounds of Karaoke songs.

The sequencer plays chorus audio data (compressed audio data such as MP3 associated with the music data) at a timing designating a chorus track. Further, the sequencer combines the character pattern of lyrics in synchronization with the progress of the song based on the lyric track, converts the character pattern into an image signal and inputs the image signal to the display processing unit 23.

The sound generator 18 generates a musical sound signal (a digital audio signal) according to data (note event data) which is input from the CPU 11 by the processing of the sequencer. The generated musical sound signal is input to the mixer 19.

The mixer 19 gives sound effects such as echo to the musical sound signal generated by the sound generator 18, chorus sound, and a singing voice signal of a singer which is input from the microphone (singing voice input means) 16 through the A/D converter 17, and mixes these signals.

In a case where communication is performed between the Karaoke devices 7 which are provided in different places and singers sing a duet, singing voice signals are transmitted from other Karaoke devices. The singing voice signals which are received from the other Karaoke devices are also input to the mixer 19, and are mixed to the singing voice signal which is input from the microphone 16 of the Karaoke device.

Each mixed digital audio signal is input to the sound system 20. The sound system 20 has a built-in D/A converter and power amplifier, converts the input digital signal into an analog signal, amplifies it, and emits it from the speaker (musical sound generation means) 21. Effects for each audio signal given by the mixer 19 and mixing balance are controlled by the CPU 11.

The CPU 11 reads out the image data stored in the HDD 13 and plays background images, in synchronization with the generation of the musical sound by the sequencer and the generation of lyrics ticker. The image data of the moving image is encoded into the MPEG format.

Further, the CPU 11 can download image data such as photos representing singers or characters from the center 1, and input the image data to the display processing unit 23. It is possible that the photos representing singers are captured by a camera (not illustrated) which is provided in the Karaoke device or the remote controller 9, or captured by a camera provided in a mobile terminal owned by the user or the like.

The CPU 11 inputs the read image data of the background image to the decoder 22. The decoder 22 converts the input data such as the MPEG into an image signal, and inputs the image signal to the display processing unit 23. In addition to the image signal of the background image, the text pattern of the lyric ticker and the image signal of the piano roll based on the guide melody track are input to the display processing unit 23.

Figure 4A:
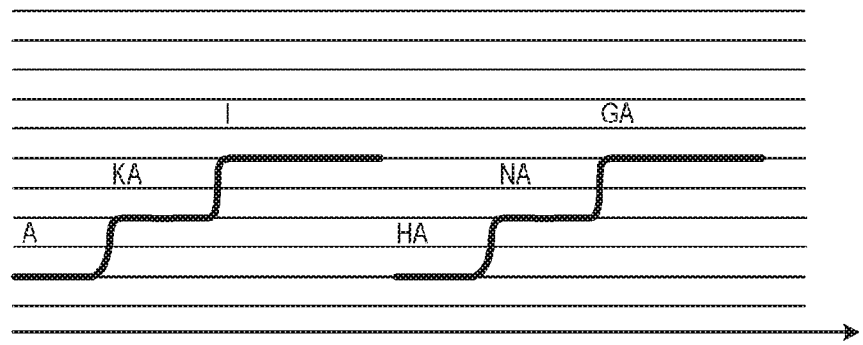
FIG. 4A is a diagram illustrating a reference display example.
Figure 4B:
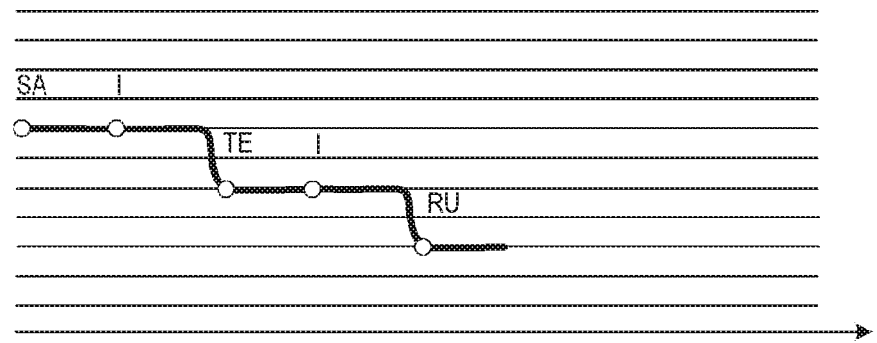
FIG. 4B is a diagram illustrating a reference display example.
Figure 4C:
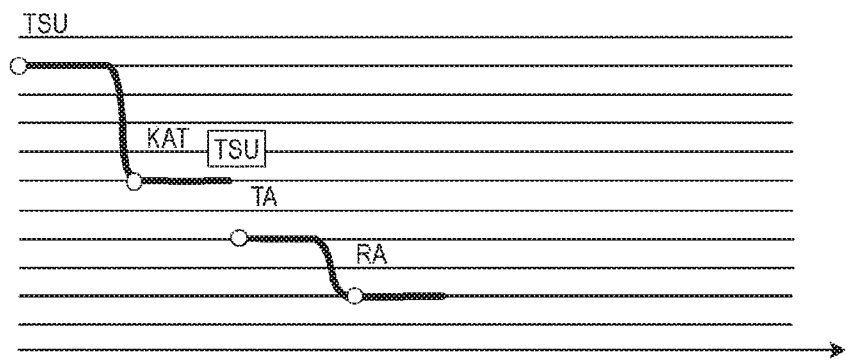
FIG. 4C is a diagram illustrating a reference display example.

FIGS. 4A to 4C are drawings illustrating examples of a piano roll. As illustrated in FIG. 4A, in the piano roll, a linear image according to the sound start, timing and the sound length of each note is displayed as the guide image, on a screen in which the vertical axis corresponds to a scale (in a state where the keys of piano are arranged vertically) and the horizontal axis corresponds to time. This allows a singer to visually recognize the timing to sing each sound and the pitch. Here, in the piano roll of this embodiment, the guide images of respective notes are displayed with connected, and the guide images are displayed with disconnected at the breathing timing.

The CPU 11 first generates a guide image, based on information about the sound start timing and the sound length of each note, which is included in the guide melody track. The CPU 11 smoothly connects the guide images of respective notes. With respect to the slope of the connecting portion of respective notes, images at the uniformly same slope are displayed, for example, such as connecting the respective notes by the time length corresponding to 16-th note. However, actually there is a specific singing method for each song and the pattern of the change in pitch is not uniform. Therefore, it is preferable that connecting portions of the respective notes are displayed at different slopes. In this case, information designating the slope depending on the change in the pitch at the connecting portion of each note may be included as the reference data.

Thereafter, the CPU 11 disconnects the guide image at the breathing timing indicated by the breath position track. For example, in the example of FIG. 4A, since there is a breathing timing after the sound "AKAI" and before the sound timing of the beginning of "HANAGA", the guide image of "ARAI" and the guide image of "HANAGA" are disconnected.

This allows a singer to visually recognize how to connect respective notes and a breathing timing. For example, in the example of FIG. 4A, a singer can visually easily recognize that a singer is to sing while smoothly changing the pitches of respective notes of "AKAI" one by one, and after breathing, sing while smoothly changing the pitches of respective notes of "HANAGA" one by one. Further, since the CPU 11 disconnect the guide image at the breathing timing indicated by the breath position track (the reference data contains information indicating the breathing timing), it is possible to clearly distinguish a simple mute section and a breathing period to display, thereby allowing the user to recognize the correct position of the breathing.

Note that, although an example in which the breath position track and the technique position track are included in a single piece of music data is illustrated in the example of FIG. 3, the breath position track and the technique position track may be prepared as separate data while keeping the existing music data with no change. In this case, new music data including the breath position track and the technique position track needs not to be prepared. However, data about the breath position track and the technique position track each includes song identification information such as song numbers. When reading music data, the CPU 11 reads the corresponding breath position track and technique position track, and performs the sequence operations.

Note that, in a case of sounding different lyrics continuously at the same pitch, if the guide images are connected, the user is unlikely to recognize a timing at which the user sounds the subsequent lyric. Thus, as illustrated in FIG. 4B, the CPU 11 superimposes, for example, a circle image on the guide image to display, at the sound timing of each note in the guide melody track. This allows the user to recognize that a timing denoted by the circular image is a timing at which the user is to sound.

Next, FIG. 4C illustrates a mode in which a guide image relating to a phoneme of a geminate consonant and a subsequent guide image subsequent to the phoneme of the geminate consonant are displayed with disconnected. The geminate consonants are represented by "TSU" in Japanese kava notation and followed by mute sound. The CPU 11 extracts the geminate consonant from the lyric track, and disconnects the guide image at a timing to make the extracted geminate consonant. In the example of FIG. 4C, since a geminate consonant exists after "KA" of "TSUKAT-TARA", the guide image of "KA" and the subsequent guide image "TA" are displayed with disconnected. Further, the example of FIG. 4C illustrates a mode in which an image indicating the existence of a phoneme relating to a geminate consonant (in this example, a rectangular image denoted y "TSU") is displayed.

This allows the singer to easily recognize whether to sound the notes continuously, or to pause at a note because of the existence of a geminate consonant.

Figure 5A:
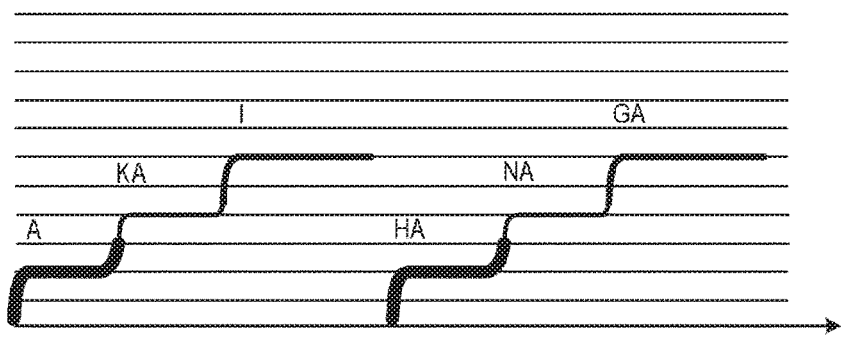
FIG. 5A is a diagram illustrating a reference display example.

Next, FIG. 5A is an example representing the volume on the guide image. In this case, information indicating the volume of each note is contained in the guide melody track. The CPU 11 changes the thickness of a line of the guide image, based on the information indicating the volume of each note contained in the guide melody track. For example, in the example of FIG. 5A, since the note "A" of "AKAI" is the largest in the volume, the section representing "A" is changed into a thick line. Since the note "NA" is small in the volume, the section representing "KA" is changed into a thin line. This example shows a mode in which the information indicating the volume contained in the guide melody track has three levels of "large", "standard" and "small", and the thickness of the line is changed to three levels, but the thickness of the line may be changed to more multi levels.

Note that, the example of FIG. 5A shows a mode in which the thickness of the line is changed at the intermediate position of the connecting portion, but the thickness of the line may be changed at the position of the beginning of each note or the end of each note. Further, with respect to the volume, the thickness of the line may be gradually changed from the end of each note to the beginning of the subsequent note.

Figure 5B:
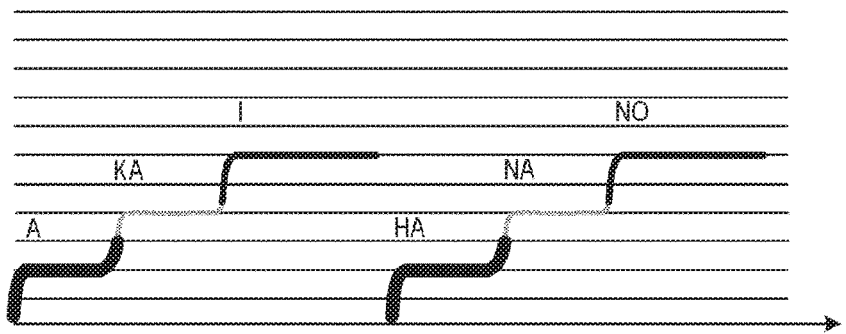
FIG. 5B is a diagram illustrating a reference display example.

Next, FIG. 5B illustrates a mode in which a volume is represented with the color of a line. The CPU 11 changes the color of a line of a guide image, based on the information indicating the volume of each note contained in the guide melody track. For example, in the example of FIG. 5B, since the note "KA" is small in the volume, the section representing "KA" is changed into a line of light color. This example shows a mode in which in a case where the information indicating the volume contained in the guide melody track is "small", the section of the note at "small" is changed into a line of light color, but the section of the note at the volume "large" may be changed to a line of dark color, or only the color may be changed without changing the thickness of the line.

Figure 6A:
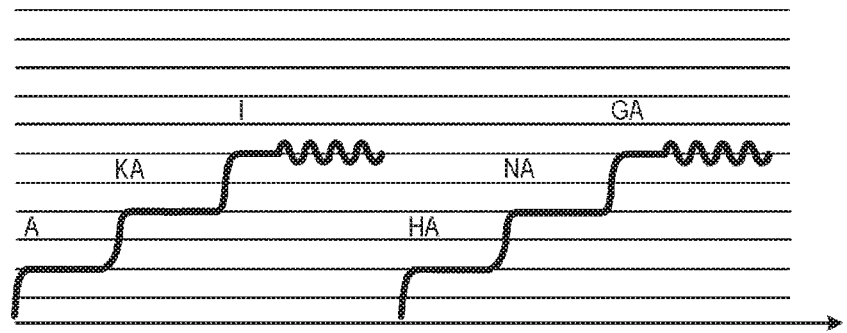
FIG. 6A is a diagram illustrating a reference display example.

Next, FIG. 6 illustrates an example in which a singing technique is represented on a piano roll. In the example of FIG. 6A, the guide image of a vibrato section is displayed with changed into a wavy line. In this case, the CPU 11 reads out information indicating a vibrato timing contained in the technique position track, and changes a section from the timing to the end, of the guide image of the note corresponding to the timing into a wavy line. Thus, the singer is likely to more intuitively recognize a timing to perform vibrato and the length of vibrato.

Figure 6B:
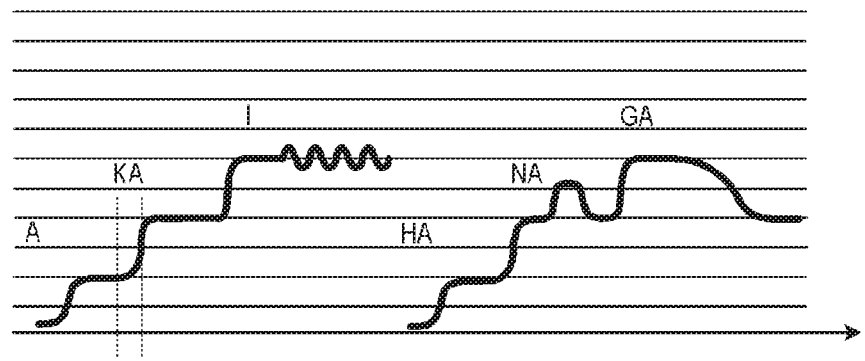
FIG. 6B is a diagram illustrating a reference display example.

Further, as illustrated in FIG. 6B, in a case where information of "TAME" is contained in the technique position track, the position of the beginning of the note (in this case, the note "KA") corresponding to the information of "TAME" is delayed. Thus, the singer is likely to intuitively recognize "TAME" in which singing of a certain sound (in this example, sound of "KA") is delayed by intent.

Further, in a case where information about "SHAKURI" is contained in the technique position track, a guide image which is raised from a pitch lower than the reference pitch to an original pitch is displayed. In the example of FIG. 6B, the note "A" in the beginning and the note "HA" are "SHAKURI", where the singer sing while raising the pitch from the pitch lower than the reference pitch. Therefore, in the guide image, the beginning of the section "A" is raised from a pitch lower than the reference pitch to an original pitch. Thus, the singer is able to intuitively recognize a singing technique of "SHAKURI" from the guide image.

Figure 6C:
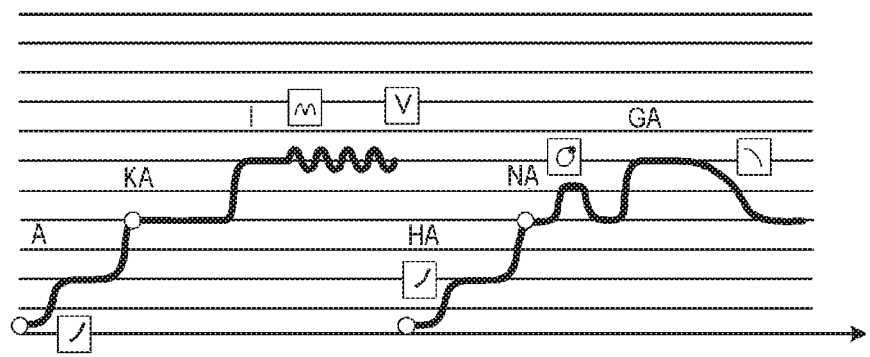
FIG. 6C is a diagram illustrating a reference display example.

Further, in a case where information about "KOBUSHI" is contained in the technique position track, the guide image is temporarily raised at the position corresponding to a "KOBUSHI" timing, as indicated in the note "NA" of FIG. 6B. This enables a guide image corresponding to "KOBUSHI" which is a singing technique of changing the tone of a particular note to a growling tone in the middle of sounding. Further, in a case where information about "Fall" is contained in the technique position track, the guide image may be changed into a low pitch from the position corresponding to "Fall" timing as indicated in the note "GA" of FIG. 6B, which enables a guide image corresponding to the "Fall" singing technique, FIG. 6C is an example displaying an image to prompt a singing technique. The CPU 11 reads out information indicating timings of various singing techniques contained in the technique position track, and displays an image to prompt the singing technique at the position corresponding to the timing. For example, "A" in the beginning is a location of "SHAKURI", where the singer sings while raising the pitch from the pitch lower than the reference pitch. Therefore, an image reminding of a raise of a pitch such as "NO" is displayed at the beginning of the section of "A". Further, with respect to the vibrato section, a wavy line-shaped image such as "m" is separately displayed in addition to the wavy line-shaped guide image. This allows the user to easily recognize a timing and a singing technique to be performed.

Further, the CPU 11 displays an image to prompt breathing in addition to the guide image, based on the information indicating the breathing timing, which is indicated by the breath position track. For example, in the example of FIG. 6C, an image such as "V" is displayed between the section of "AKAI" and the section of "HANAGA", This allows the singer to recognize more easily whether to sound the notes continuously, or to take a breath.

As described above, Karaoke is played, and the piano roll is displayed according to the progress of performance. Since a guide image is displayed in which respective notes are smoothly connected in this manner, as compared to the piano roll in the related art, the singer more easily performs singing by connecting respective notes smoothly or taking a breath while viewing the guide image.

Subsequently, the grading process will be described. The grading process is performed by comparing the singer's singing voice with the guide melody track. The grading is performed by comparing the singing voice with the pitch (pitch) of the guide melody, at each note of the guide melody track. In other words, in a case where the pitch of the singing voice matches the pitch of the guide melody track for a predetermined time or more (entering an acceptable range), a high score is given. Further, a pitch change timing is also considered for scoring. Further, an additional score is given based on the presence or absence of a singing technique such as a pitch changing timing, vibrato, pitch, and SHAKURI (smooth transition from a low pitch).

Further, in the grading process of this embodiment, whether or not the singer takes a breath at the breathing timing contained in the breath position track is to be scored. With respect to determination as to whether or not breathing is performed within a predetermined time including the breathing timing, it is determined that breathing is performed in a case where voice is not input from the microphone 16 (the input level is less than a predetermined threshold) or the breathing sound is input from the microphone 16, while it is determined that breathing is not performed in a case where voice is input from the microphone 16 (the input level is the predetermined threshold or more). Note that, whether or not the breathing sound is received is judged by comparing with the wave of a breathing sound through pattern matching or the like.

Further, in the grading process of this embodiment, it is preferable to give a higher score in a case of detecting the same technique at timings of each technique included in the technique position track.

Note that, the grading process may be performed by each Karaoke device, but may be performed by the center 1 (or another server). Further, in a case where a duet is performed with another Karaoke device through a network, the grading process may be performed by a single Karaoke device performing a process representatively.

Subsequently, the operation of the Karaoke system will be described with reference to the flowchart. FIG. 7 is a flowchart illustrating the operation of the Karaoke system.

First, a singer makes a request of a musical piece (s11). At this time, in a case where a duet music is selected, the CPU 11 displays an image to prompt selection as to whether to perform a duet with a singer of another Karaoke device connected through the network, on the monitor 24, and receives duet singing through the network. For example, if the singer inputs the name of a certain user by using the touch panel 15, the manipulation unit 25, or the remote controller 9, the center 1 searches for a user corresponding to the name, and sets the user as a duet partner.

Subsequently, the CPU 11 of the Karaoke device reads out music data which is requested (s12), and generates a piano roll (s13). In other words, the CPU 11 generates a guide image, based on information about the sound start timing and sound length of each note which are included in the guide melody track.

Thereafter, the CPU 11 reads out the lyric track (s14), and associates the image of the lyric with each guide image (s15). Further, the CPU 11 reads information about the breathing timing from the breath position track, and reads the sound timing relating to the phoneme of geminate consonants (s16). The CPU 11 smoothly connects the guide images of respective notes (s17). In this case, the CPU 11 displays the guide image with disconnected at the breathing timing indicated by the breath position track and the sound timing relating to the phoneme of a geminate consonant.

Further, the CPU 11 reads out the technique position track (s18), and displays the singing technique on the piano roll (s19). The CPU 11 changes the guide image depending on the singing technique. For example, the vibrato section is displayed with the guide image changed into a wavy line.

Further, the CPU 11 reads out information indicating the volume of each note contained in the guide melody track (s20), and changes to the guide image depending on the volume of each note (s21). For example, the thickness of a line is changed depending on the volume as illustrated in FIG. 5A, or the color of a line is changed depending on the volume as illustrated in FIG. 5B.

In addition, this embodiment illustrates a mode in which Karaoke is played and the piano roll is displayed by using the Karaoke device 7, but for example, the display device of the present invention can be realized even by using an information processing apparatus (including a microphone, a speaker, and a display) such as a PC, a smart phone, or game machine which is owned by the user. Note that, music data and reference data do not need to be stored in the display device, but may be downloaded from a server at each time to be used.

Figure 8:
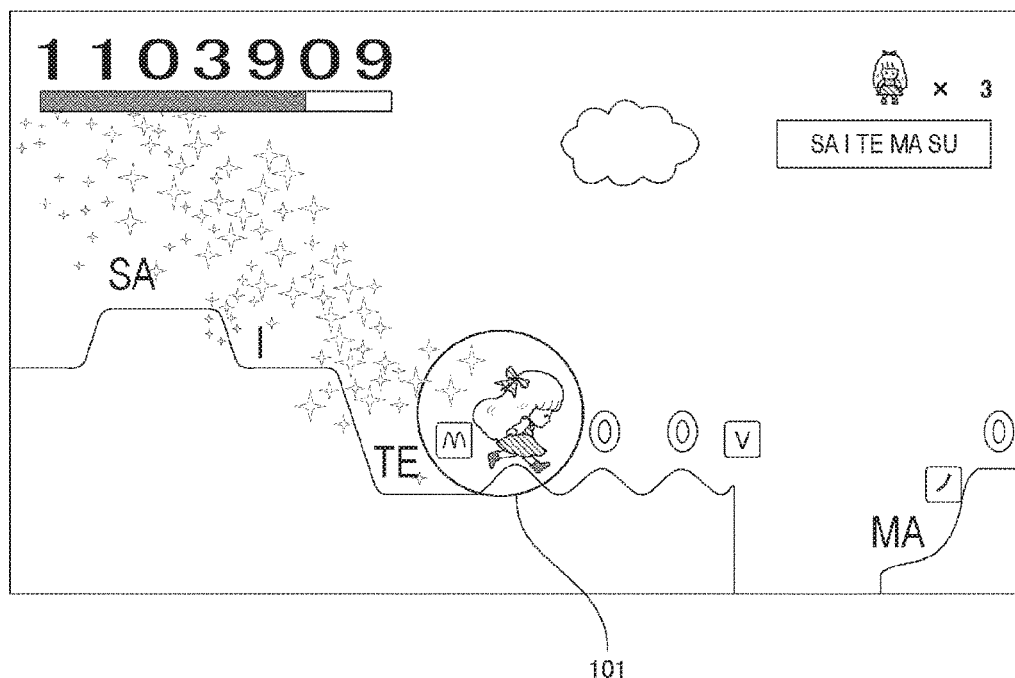
FIG. 8 is a reference display mode of according to an application example.

Further, as illustrated in FIG. 8, the CPU 11 may display a character at the current singing position. In this example, the guide image corresponds to the image of the ground, and the image of the ground is cut at the breathing timing. The guide image and the background are scrolled such that a character image 101 is moved along the guide image (the image of the ground). Since the ground is cut at the breathing timing, it is configured that the character image 101 falls from the ground in a case where breathing is not detected (in a state where voice is not input from the microphone 16). Further, in this example, the result of singing grading is displayed on the screen. Therefore, the singer can enjoy Karaoke as a game.

Figure 9:
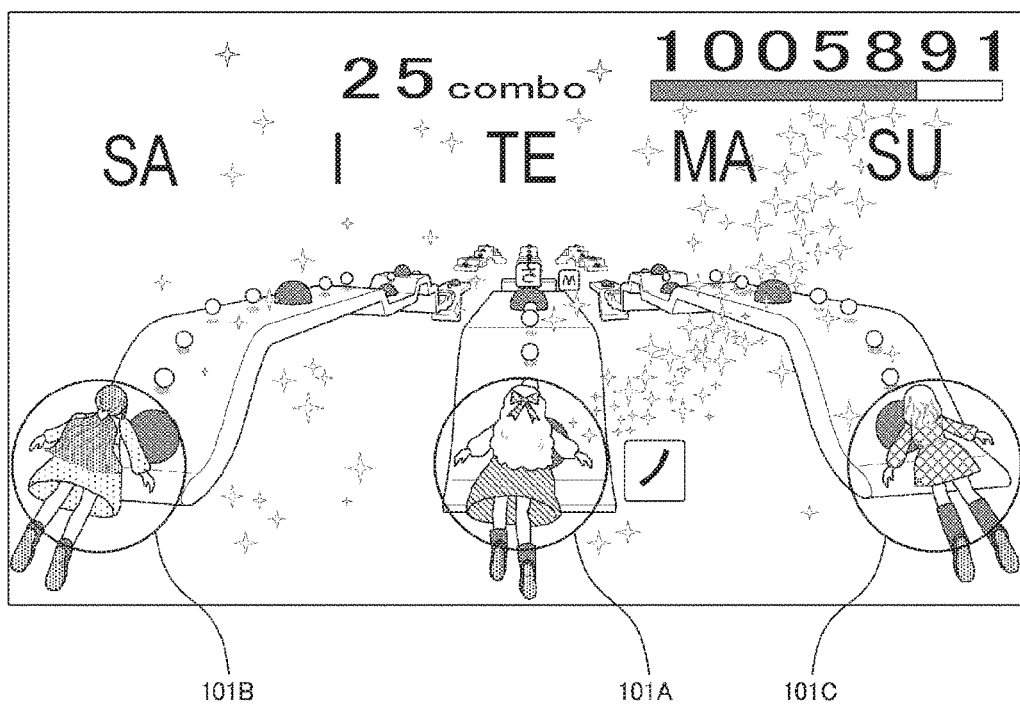
FIG. 9 is a reference display mode of according to an application example.

Further, the guide image may be displayed in an objective viewpoint (two-dimensional display, two-dimensional viewpoint) as illustrated in FIG. 8, or may be displayed in a subjective viewpoint (three-dimensional display, three-dimensional viewpoint) as illustrated in FIG. 9. The subjective viewpoint is a display mode of imitating the user's own vision, and a type of three-dimensional viewpoint. Here, a display mode is illustrated in which the depth direction corresponds to a time axis, and the plane direction corresponds to a pitch. For example, as illustrated in FIG. 9, there is a display mode in which the depth direction corresponds to a time, and the vertical direction corresponds to a scale.

Note that, the example of FIG. 9 illustrates a mode in which an image (a character image or the like) corresponding to the user is displayed and the character image or the like is displayed in a manner of being projected from behind, and this display mode corresponds to the three-dimensional viewpoint. Note that, the scale may correspond to the lateral direction. In this case, the guide image and the background are scrolled such that the character image 101A is moved along the guide image in the depth direction. Also in this example, the result of singing grading is displayed on the screen. Therefore, the singer can enjoy Karaoke as a game.

Further, as illustrated in FIG. 9, in a case of display in the subjective viewpoint, in a case of performing duet singing, a character image 101A corresponding to the user and a character 101B corresponding to another singer (and a character image 101C) can be displayed in parallel. This allows the user to more feel the mood in which the user performs singing together with another singer.

Further, described in this embodiment is an example in which a guide melody in Karaoke is displayed as a guide image, but for example, the same effect is achieved even in a mode in which a change in the sample pitch of a wind instrument performance is displayed as a guide image and the guide image is cut at the breathing timing. Further, for example, the same effect is achieved in language learning, even in a mode in which a guide image representing a sound timing and a sound length of a sample model is displayed, and the guide image is cut at the breathing timing and the geminate consonant. An example in which lyrics are displayed is described in this embodiment, but the display of lyrics is not essential in the present invention.

Figure 10:
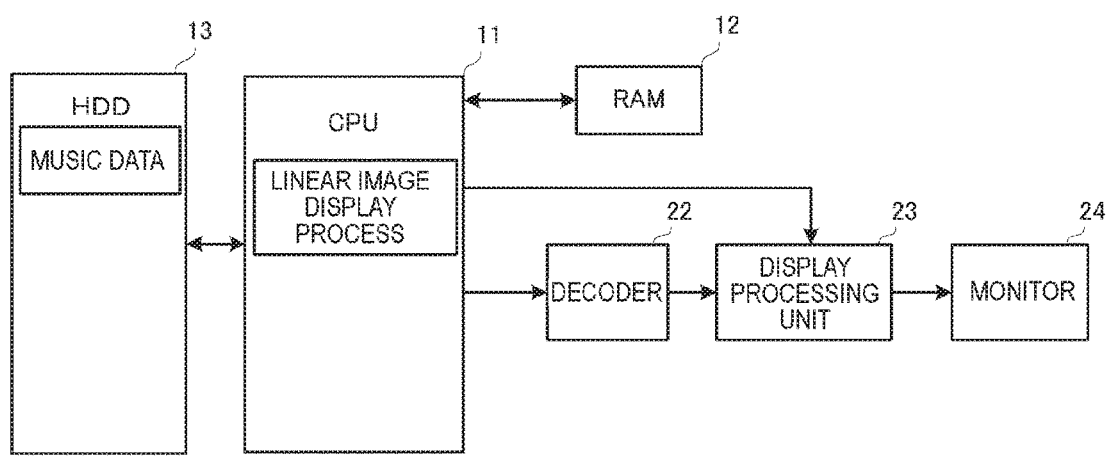
FIG. 10 is a block diagram illustrating a minimum configuration of a reference display device.

Note that, as illustrated in FIG. 10, the reference display device of the present invention may have a mode which includes the monitor 24 which is a display, and the CPU 11 functioning as an image generator for performing a guide image display process, and in which the CPU 11 generates a guide image based on music data (an example of reference data of the present invention) stored in the HDD 13, and connects the respective notes of the guide image. Other hardware configuration components are not essential elements in the present invention.

Further, as described above, the reference data do not need to be stored in the HDD 13, but may be downloaded from the outside (for example, a server) at each time to be used. Further, the decoder 22, the display processing unit 23, and the RAM 12 may be embedded in the CPU 11 as a part of the function of the CPU 11.

Note that, displaying the guide image as the piano roll (the vertical axis corresponds to the keys of piano, and solid lines are displayed in the horizontal axis direction) is not essential. For example, various display modes may be possible, as long as a guide image representing sound timings, pitches, and sound lengths is generated and respective notes are connected as illustrated in FIG. 8 and FIG. 9. Note that, the guide image referred to in the present invention is not limited to the elongated lines illustrated in FIG. 4A to FIG. 6, but as illustrated in the example of FIG. 9, may be an image which has a certain width in the lateral or vertical direction and extends in one direction the depth direction in the example of FIG. 9).

The present application is based on and claims the priority of Japanese Patent Application No. 2014-152479 filed on Jul. 28, 2014 and is incorporated herein by reference.

REFERENCE SIGNS LIST

1: CENTER
2: NETWORK
3: KARAOKE STORE
5: RELAY
7: KARAOKE DEVICE
9: REMOTE CONTROLLER
11: CPU
12: RAM
13: HDD
15: TOUCH PANEL
16: MICROPHONE
17: A/D CONVERTER
18: SOUND GENERATOR
19: MIXER,
20: SOUND SYSTEM
22: DECODER
23: DISPLAY PROCESSING UNIT
24: MONITOR
25: MANIPULATION UNIT
26: TRANSMISSION/RECEPTION UNIT

The invention claimed is:

1. A reference display device comprising:
a display;
generator, a processor configured to generate a guide image representing a sound timing, pitch, and a sound length based on reference data and to display the guide image on the display,
wherein:
the reference data contains information indicating a breathing timing,
the processor is configured to display the guide image with respective notes in the reference data being connected in a guide connection, and with previous and subsequent notes of the breathing timing being disconnected, based on the information indicating the breathing timing, and
previous and subsequent notes of the guide connection, which are different in pitch, are connected via a guide connecting portion, a pitch of which gradually changes in time from the previous note to the subsequent note of the guide connection.

2. The reference display device according to claim 1, wherein the processor is configured to display the guide image in which a first phoneme relating to a geminate consonant and a second phoneme subsequent to the first phoneme relating to the geminate consonant are disconnected.

3. The reference display device according to claim 1, wherein the processor is configured to display an image to prompt breathing in addition to the guide image, based on the information indicating the breathing timing.

4. The reference display device according to claim 1, wherein the processor is configured to superimpose an image indicating a sound-producing timing of each note on the guide image to display.

5. The reference display device according to claim 1, wherein the reference data contains information indicating a volume of each note, and
the processor is configured to change the guide image depending on the volume based on the information indicating the volume of each note to display.

6. The reference display device according to claim 5, wherein the processor is configured to change the guide image in at least one of a size, a color, and a tint thereof, depending on the volume, based on the information indicating the volume of each note to display.

7. The reference display device according to claim 1, wherein the guide image is displayed from a two-dimensional viewpoint in which one direction of a plane direction on the display corresponds to a time axis and the other direction of the plane direction corresponds to a pitch.

8. The reference display device according to claim 1, wherein the guide image is displayed as an elongated linear image.

9. The reference display device according to claim 1, wherein the guide image is displayed from a three-dimensional viewpoint in which a depth direction on the display corresponds to a time axis, and a plane direction corresponds to a pitch.

10. The reference display device according to claim 9, wherein the guide image is displayed as an elongated linear image which extends in the depth direction, or a plate-like image which has a width in the plane direction and extends in the depth direction.

11. The reference display device according to claim 1, wherein a finish end of the previous note and a start end of the subsequent note of the guide connection are connected via the guide connecting portion.

12. The reference display device according to claim 1, wherein an image representing the previous note and an image representing the subsequent note of the guide connection extend in a first direction, and the guide connecting portion extends in a second direction intersecting the first direction, but excluding a right angle.

13. The reference display device according to claim 8, wherein the guide connecting portion is displayed with an elongated sloped line connecting the previous and subsequent notes of the guide connection.

14. The reference display device according to claim 10, wherein the guide connecting portion is displayed with an elongated sloped line connecting the previous and subsequent notes of the guide connection.

15. The reference display device according to claim 10, wherein the guide connecting portion is displayed with a plate-like slope image connecting the previous and subsequent notes of the guide connection.

16. A reference display method in an information processing apparatus which comprises a display, the reference display method comprising:
   generating a guide image and
   displaying the guide image on the display, the guide image representing a sound timing, a pitch, and a sound length, based on reference data containing information indicating a breathing timing,
   wherein the guide image is displayed with respective notes in the reference data being connected in a guide connection, and with previous and subsequent notes of the breathing timing being disconnected, based on the information indicating the breathing timing, and
   wherein previous and subsequent notes of the guide connection, which are different in pitch, are connected via a guide connecting portion, a pitch of which gradually changes from the previous note to the subsequent note of the guide connection.

17. A non-transitory computer-readable storage medium storing a program that, when executed by a processor, causes an information processing apparatus, which comprises the processor and a display, to execute:
   generating a guide image representing a sound timing, a pitch, and a sound length, based on reference data and
   displaying the guide image on the display,
   wherein:
      the reference data contains information indicating a breathing timing,
      the guide image is displayed with respective notes in the reference data being connected in a guide connection, and with previous and subsequent notes of the breathing timing being disconnected, based on the information indicating the breathing timing, and
      previous and subsequent notes of the guide connection, which are different in pitch, are connected via a guide connecting portion, a pitch of which gradually changes from the previous note to the subsequent note of the guide connection.

* * * * *